United States Patent [19]
Alesio

[11] Patent Number: 5,481,600
[45] Date of Patent: Jan. 2, 1996

[54] INSTANT CALLING CARD PROVISIONING SYSTEM

[75] Inventor: Thomas Alesio, Marina Del Rey, Calif.

[73] Assignee: AT&T Corp., Murray Hill, N.J.

[21] Appl. No.: 383,907

[22] Filed: Jan. 17, 1995

Related U.S. Application Data

[63] Continuation of Ser. No. 997,256, Dec. 23, 1992, abandoned.

[51] Int. Cl.⁶ .......................... H04M 15/00; H04M 11/00; H04M 17/00
[52] U.S. Cl. ............................ 379/114; 379/91; 379/112; 379/121; 379/144
[58] Field of Search ............................ 379/91, 112, 113, 379/114, 115, 144, 155, 143, 130, 131, 121

[56] References Cited

U.S. PATENT DOCUMENTS 4,187,498  2/1980  Creekmore .............................. 379/91 X
4,750,201  6/1988  Hodgson et al. ....................... 379/91 X
4,756,020  7/1988  Fodale .................................... 379/91 X
4,776,003  10/1988 Harris ......................................... 379/91
4,893,330  1/1990  Franco ........................................ 379/91

Primary Examiner—Stephen Chin
Assistant Examiner—Paul Loomis
Attorney, Agent, or Firm—Ronald D. Slusky

[57] ABSTRACT

Calling card subscribers are allowed to charge telephone calls to calling card numbers before the calling card issuer's billing system is updated to include account records containing subscriber-specific information associated with those card numbers. Billing data associated with calls charged to those card numbers are stored until account records are created for those card numbers. Upon the creation of an account record for one of those card numbers, subscriber-specific information contained in the account record is combined with the stored billing data associated with that card number to form a conventional billing record for further processing.

20 Claims, 4 Drawing Sheets

ACCOUNT RECORD

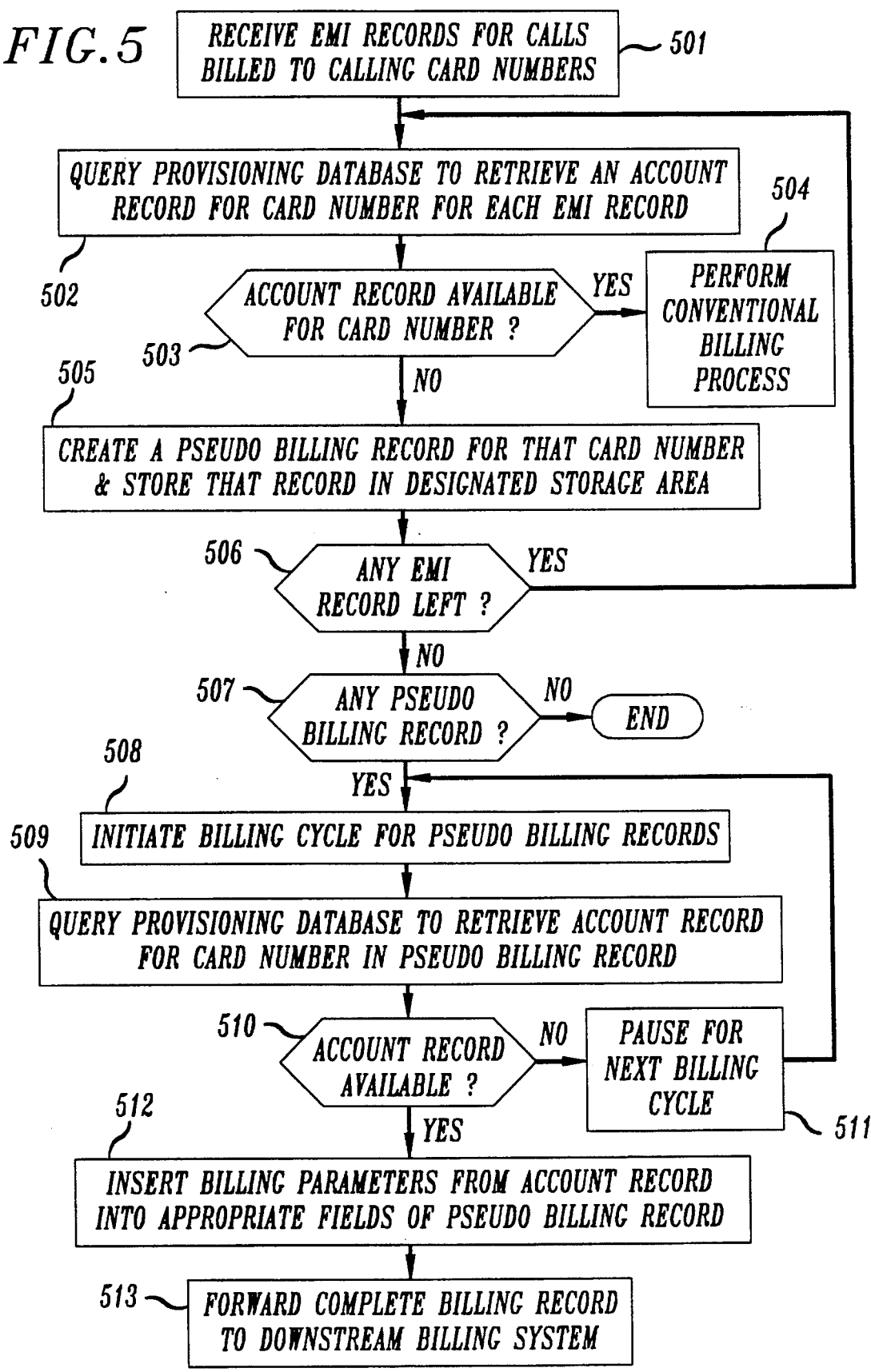

5,481,600

INSTANT CALLING CARD PROVISIONING SYSTEM

TECHNICAL FIELD

This invention relates to communications systems, and more particularly, to a method and system for billing telephone calls charged to calling card numbers. This application is a continuation of Ser. No. 07/997,250 filed Dec. 23, 1992 now abandoned.

BACKGROUND OF THE INVENTION

Typically, a prospective calling card subscriber who applies for a calling card has to wait a period of time for the application to be processed by the calling card issuer and subsequently for a calling card to be issued to the subscriber. The delay in processing calling card applications is largely attributable to the need to update the card issuer's billing system to create an account record for the subscriber, the account record being needed to allow telephone calls charged to the card number to be billed to the subscriber. The subscriber's account record contains information that is provided by the subscriber in the course of the calling card application process and that is associated with the calling card number.

SUMMARY OF THE INVENTION

The above-mentioned time delay is eliminated in accordance with the invention, by adapting a calling card billing system to permit a calling card subscriber to charge calls to an issued calling card number before an account record is created for that subscriber, such a calling card number being herein referred to as a "pre-approved calling card number". This is in marked contrast to conventional calling card billing systems, which require a calling card number to be mapped to at least one subscriber-identifying billing parameter,—such as a subscriber's telephone number and/or a billing number (ordinarily found in the account record)—before calls can be charged to that calling card number.

In accordance with the invention, when an account record is unavailable for a pre-approved calling card number to which a telephone call has been charged, billing data associated with that call are stored by the billing system. Once the account record has been created within the billing system, billing parameters included in the account record are combined with the call's stored billing data to form a billing record for conventional processing.

In an exemplary embodiment of the invention, the billing system during its regular periodic cycle stores as received, billing data associated with calls charged to calling card numbers for which no account records are available. In the next regularly scheduled billing cycle, the stored billing data are resubmitted for processing along with other calls' billing data (being submitted for the first time). The stored billing data associated with each individual card number for which no account record is available are resubmitted at each billing cycle until such time as an account record is created for that particular card number. At that time, billing parameters retrieved from the account record are combined with the stored billing data to create a billing record for conventional processing.

In a second embodiment of the invention, the billing system formats and stores in a pseudo billing record billing data associated with a call billed to a calling card number for which no account record currently exists. A pseudo billing record is a conventional billing record with some missing billing parameters. When an account record is created for that card number, billing parameters retrieved from that account record are inserted into the appropriate fields of the pseudo billing record to form a complete conventional billing record for further processing.

Advantageously, the invention allows a card issuer to stage calling card promotions, for example: at shopping centers, college campuses, or military bases, at which calling card applicants are handed pre-approved calling cards at the time of application, so that telephone calls can be charged immediately. If desired, restrictions could be imposed on a pre-approved calling card number until such time that an account record is created for the subscriber in question. The restrictions could, for example, a) set a limit on the number of calls or costs charged to the card number, and/or b) restrict destination numbers accessible for calls charged to that card number. The restrictions would be removed for a particular subscriber, once his/her account record has been created in the billing system.

BRIEF DESCRIPTION OF THE DRAWING

FIG. 5 also shows a flow diagram of functions performed by different elements of FIG. 1 to implement another embodiment of the invention.

DETAILED DESCRIPTION

Figure 1:
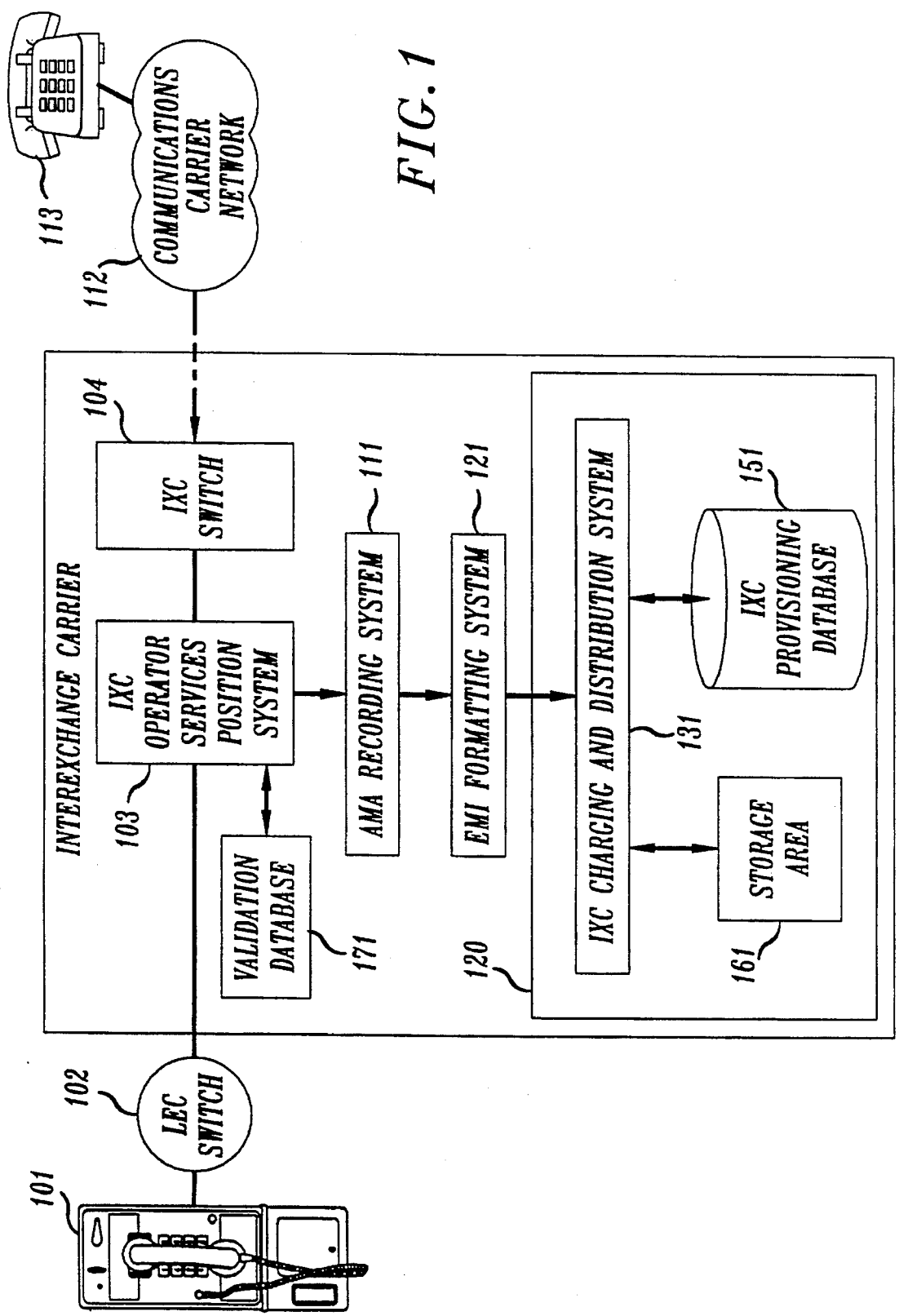
FIG. 1 is a block diagram of a communications system arranged in accordance with the invention to complete calling card calls billed to pre-approved calling card numbers and to create billing records for those calls.

FIG. 1 is a block diagram of a communications system arranged in accordance with the invention to complete calling card calls billed to pre-approved calling card numbers and to create billing records for those calls. The communications system of FIG. 1 includes Local Exchange Carrier (LEC) switch 102, which is a central office switch, and Interexchange Carder (IXC) Operator Services Position System (OSPS) 103. The latter is a communications processor arranged to provide automated and/or operator-assisted call processing capabilities to handle calling card calls switched by a communications carrier, such as AT&T.

The communications system of FIG. 1 further includes IXC switch 104 which is a processor-controlled software-driven communications processor arranged to switch calls, typically, to another IXC switch and/or to a LEC switch. Connected to IXC switch 104 is communications carrier network 112 which is comprised of LEC and IXC switching and transmission facilities designed to route calls to appropriate destinations.

In this example, when a caller at station set 101 initiates a calling card call to station set 113, by dialing "0" and the destination number, the latter is received by LEC switch 102, which is arranged to recognize the prefix "0" as a request by the caller for an operator-assisted call. In this example, the call requires the services of an interexchange carrier. Accordingly, LEC switch 102 routes the call to OSPS 113, and forwards thereto a) the destination number dialed by the caller, and b) station set 101 telephone number. Upon receiving that information, OSPS 103 presents to the caller a "bong" tone followed by a message identifying the carder processing the call, and prompts the caller to enter a calling card number if the caller has not already done so after the carder-identifying message. Thereafter, OSPS 103 launches a query to a validation database 171 to authenticate the card number. Assuming that the card number is valid, OSPS 103 routes the call to IXC switch 104. The latter in turn, passes the call to communications carrier network 112 which completes the call to station set 113 in a conventional manner. Validation database 171 is a repository of records for all calling card numbers assigned by the card issuer in question to its calling card subscribers. Typically, the system will include other similar databases (not shown) maintained by other card issuers.

Of particular importance among the fields included in the records of validation database 171 is a flag indicating whether or not restrictions are imposed on card numbers. As mentioned above, a feature of the invention is to impose temporary restrictions on calling card numbers provided to certain applicants until an account record can be created for those applicants. Those restrictions can a) set a limit on the number of calls or costs billed to those card numbers and/or b) restrict destination numbers accessible for calls charged to those card numbers. Techniques to implement those restrictions are disclosed in a) U.S. Pat. No. 4,893,330 issued Jan. 9, 1990; b) co-pending U.S. application Ser. No. 07/786,191; filed Oct. 31, 1991 and c) co-pending U.S. application Ser. No. 07/966,787 filed in Oct. 27, 1992. Once an account record is created for these card numbers, the restrictions are removed to allow unrestrained use of the card numbers.

Assuming that there are no restrictions preventing the completion of a calling card call, at the termination of the call, OSPS 103 forwards appropriate billing data to AMA recording system 111 which records the relevant billing data for the call in a so-called "automatic message account" or AMA message record. Among the various message record fields for a calling card call are the calling card number, the originating and terminating telephone numbers, and duration of the call. Message records accumulated in AMA recording system 111 are polled periodically and downloaded to EMI formatting system 121 which reformats the received AMA message records into an industry standard format known as "Exchange Message Interface" (EMI). A conceptual representation of an EMI record for a calling card call is illustrated in FIG. 2.

Figures 2, 3:
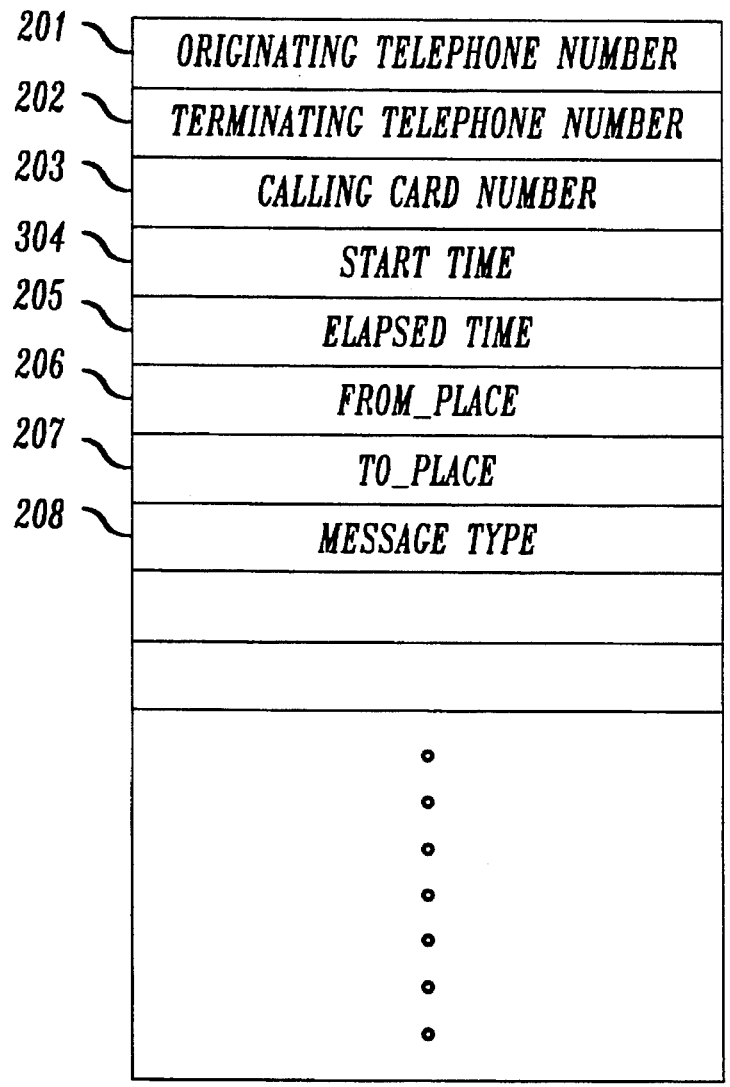
FIG. 2 is a conceptual representation of a formatted record received by the billing system of FIG. 1 for a calling card call.
FIG. 3 is a simplified representation of an account record stored in the provisioning database of FIG. 1.

As shown in FIG. 2, an EMI record includes a) an originating telephone number 201 (in this example, the telephone number associated with telephone set 101 of FIG. 1); b) a terminating telephone number 202, i.e., the telephone number associated with station set 113 of FIG. 1; c) a calling card number 203 c) start time 04 which indicates the time at which the calling card call was initiated; d) elapsed time 205 reflecting the duration of the call; e) from_place 206 and to_place 207 indicating respectively, the geographic call origination and termination points; and f) message type 208 designating the type of call (in this example a domestic calling card call). Message type 208 is particularly important because it points to the appropriate billing system to which the EMI record should be forwarded for further processing. The EMI record, in this example, is forwarded to billing system 120.

Referring back to FIG. 1, after the EMI record has been received by billing system 120 and more particularly IXC charging and distribution system 131, the latter uses rating parameters stored therein to determine the applicable toll charge for the call. Charging and distribution system 131 is a processor with memory facilities containing programs designed to create billing records with applicable toll charges for calling card calls. Charging and distribution system 131 is also arranged to forward billing records that it generates to the IXC or other entities downstream sub-billing systems (not shown) in order for the billing record to be further processed ultimately resulting in the billing record appearing as a line item entry in a "hard copy" bill mailed to the subscriber.

In order for charging and distribution system 131 to create a billing record for a call, it has to query IXC provisioning database 151 to retrieve billing information needed to be inserted into particular fields in that billing record. IXC provisioning database 151 is a centralized database facility arranged to store, inter alia, information provided by calling card subscribers when they apply for their calling cards. Such information includes, for example, the telephone number with which the calling card calls are to be associated—the so-called billing telephone number. In IXC provisioning database 151, each calling card subscriber has an account record which includes billing parameters needed by IXC charging and distribution system 131 to create the billing record for a calling card call. A simplified representation of an account record stored in IXC provisioning database 151 is illustrated in FIG. 3.

As shown in FIG. 3 an account record includes calling card number 301, billing telephone number 302, billing number 303, calling plan id 304, and biller id 305. In this example, calling card number 301 is the pre-approved calling card number provided to the subscriber by the card issuer. Billing telephone number 302 is the subscriber's telephone number which may be used as a search key to retrieve for example, the address of the subscriber when a "hard copy" bill is printed for the subscriber. Billing number 303 serves the same functions performed by billing telephone number 302 and is a substitute for the latter when the subscriber e.g., a college student, does not have a telephone number associated with his or her calling card number. Calling plan id 304 is a code identifying specific discount calling plans offered by a carrier and selected by the subscriber. The AT&T Reach Out America® plan is an example of such a discount calling plan. Biller id 305 identifies the entity that will ultimately produce the hard copy bill delivered to the subscriber. Specifically, a calling card subscriber may receive a hard copy bill from either a credit card vendor (when the credit card includes a calling card number), the interexchange or regional carrier issuing the calling card or by a local exchange carrier which renders a bill to the subscriber on behalf of the card issuer. Thus, biller id 305 also indicates a specific downstream processing system to which a billing record has to be forwarded.

Figure 4:
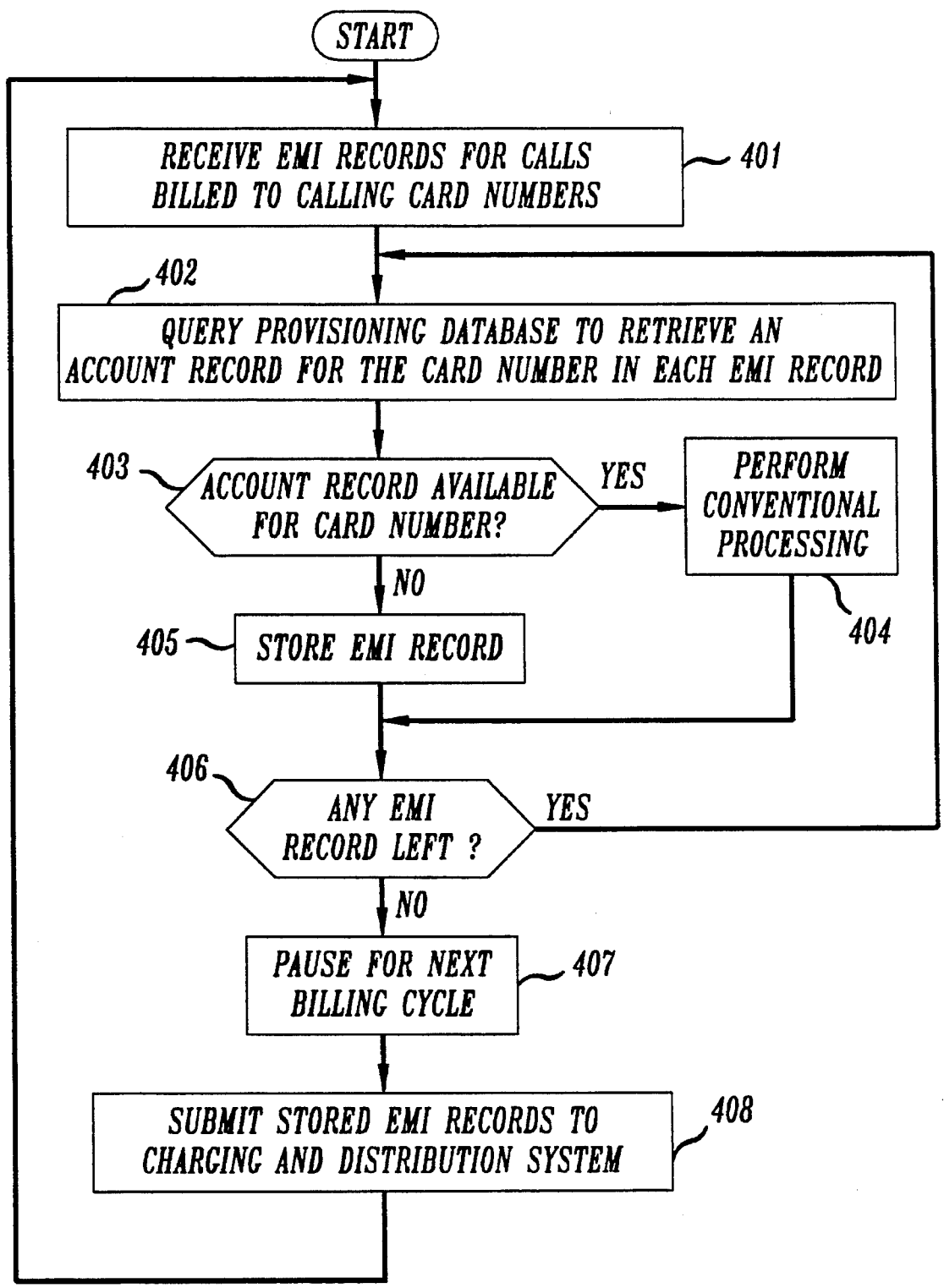
FIG. 4 shows a flow diagram of functions performed by some of the elements of FIG. 1 to implement an embodiment of the invention.

The billing process contemplated by the invention is initiated in step 401 of FIG. 4 when charging and distribution system 131 receives EMI records for calls billed to calling card numbers. Those EMI records are typically received by charging and distribution system 131 in the course of its regularly scheduled billing cycle. In step 402, IXC provisioning database 151 is queried to retrieve an account record for the card number in each EMI record. In step 403, a determination is made as to whether an account record is available for that card number. If an account record is available, conventional billing functions are performed in step 404.

If an account record is not available for the card number in the EMI record, however, charging and distribution system 131, in step 405, stores that EMI record in temporary storage area 161. In step 406, a determination is made as to whether all EMI records have been processed in the billing cycle. If there are still unprocessed EMI records, steps 402 to 406 are repeated until all EMI records have been processed. In step 407, charging and distribution system pauses for the next billing cycle in which the EMI records stored in step 405 are resubmitted for processing with other EMI records. Steps 401 to 408 are repeated as part of a new billing cycle in which billing records for calls charged to pre-approved calling cards are resubmitted for processing on a regular basis until an account record is created for that card number and conventional processing can take place in step 404 for the billing record associated with that card number.

FIG. 5 is a flow diagram of functions performed by different elements of FIG. 1 to implement an alternative embodiment of the invention. As in the previous embodiment, EMI records are received by charging and distribution system 131, in step 501, as part of a regularly scheduled billing cycle. For each EMI record, charging and distribution system 131 queries provisioning database 151 in step 502, to retrieve the account record for the card number in the EMI record. A determination is made in step 503, as to the availability of an account record for that card number. When an account record is available, conventional processing is performed in step 504. If an account record is not available, however, charging and distribution system 13 1, in step 405 creates a pseudo billing record that is forwarded to temporary storage area 161 of FIG. 1. The pseudo billing record is a billing record which is arranged in the same format dictated by the downstream card billing systems for conventional billing records. In addition, a pseudo billing record is distinguished from a conventional billing record by the absence of some billing parameters that charging and distribution system 131 was unable to retrieve from provisioning database 151 due to the unavailability of an account record for the card number. Charging and distribution system 131 inquires in step 506 as to whether all EMI records have been processed for that billing cycle. Upon a negative answer to that inquiry, steps 502 to 506 are repeated until all EMI records have been processed.

At the end of the billing cycle, charging and distribution system 131 determines, in step 507, whether any pseudo billing records are found in temporary storage area 161. Those pseudo billing records could have been created either as a result of the operations of the recently completed billing cycle or previous billing cycles. In the event that one or more pseudo billing records were found, a special billing cycle is initiated in step 508 after a predetermined time-period-pause. In that special billing cycle, charging and distribution system 131, in step 509 queries provisioning database to determine in step 510 whether an account record has been created for the card number in each pseudo billing record. When no account record is available for a card number in a pseudo billing record, charging and distribution system 131 pauses for the next special pseudo record billing cycle in step 511 and repeats steps 508 to 511 until an account record is found. If an account record is available for the card number in a pseudo billing record, however, appropriate fields from the account record are inserted into the pseudo billing record to form a conventional billing record in step 512. Subsequently, in step 513, the conventional billing record is distributed to the appropriate downstream processing system for the billing record to be included as a line item in the hard copy bill prepared for the subscriber.

The foregoing is to be construed as only being illustrative embodiments of this invention. Persons skilled in the art can easily conceive of alternative arrangements providing functionality similar to these embodiments without any deviation from the fundamental principles or the scope of this invention.

I claim:

1. A method of operating a computer system for billing a calling card call completed over a communications switching system, said method comprising the steps of:

assigning in a database a calling card number associated with a subscriber for whom at least one billing parameter is unavailable and is needed to create a complete billing record when said card number is used;

in response to receiving in said database a request for a calling card call to be charged to said calling card number, validating said calling card number;

storing in said database billing data associated with said calling card call and said calling card number upon completion of said calling card call; and in response to receiving signals indicative of availability of said at least one billing parameter, generating a billing record for said calling card call by entering said at least one billing parameter in at least one specific field in said billing record and by processing said stored billing data to be included in said billing record.

2. The method of claim 1 further comprising the steps of:

periodically checking the availability of said at least one billing parameter for said calling card number;

combining said billing data and said at least one billing parameter to create said billing records when said at least one billing parameter information becomes available.

3. The method of claim 2 wherein the step of storing billing data associated with said call further includes the step of:

formatting said billing data to form a pseudo billing record for said call, said pseudo billing record having an identical format to a billing record to facilitate subsequent inclusion of at least pan of said at least one billing parameter in said pseudo billing record to form a complete billing record.

4. The method of claim 1 wherein said billing records include information associated with said call, said calling card number and said subscriber.

5. A method for use in a telephone system which is normally operative to store calling card numbers and to store subscriber-specific information associated with each of said card numbers at a time substantially contemporaneous with the storing of the associated card number, said method comprising the steps of:

storing in a database at least a first calling card number without substantially contemporaneously storing any subscriber-specific information associated with that card number, accepting said first calling card number for the charging of telephone calls and creating a pseudo billing record for each of said telephone calls; and subsequently receiving and storing in said database subscriber-specific information associated with said first calling card number and adding said information to said pseudo billing record to create a complete billing record.

6. The method of claim 5 wherein said information added to said billing record includes a billing number associated with said calling card number and said subscriber.

7. A method for billing telephone calls charged to calling card numbers comprising the steps of:

receiving billing data associated with said calls;

querying a database to retrieve billing parameters stored for each calling card number;

if said billing parameters are available for a particular one of said card numbers, generating for each call charged to said particular card number a billing record which includes said billing parameters; and if said billing parameters are unavailable for a particular one of said card numbers, periodically repeating said querying step until said billing parameters become available and billing records are generated for calls charged to said particular card number.

8. A method of administering calling card numbers, said method comprising the steps of:

creating in a database account records for said calling card numbers, said account records having at least one field that is empty due to unavailability of information needed to be stored in said at least one empty field;

placing restrictions on use of said calling card numbers; and removing said restrictions in order to permit unrestricted use of said calling card numbers, when said information needed to be stored in said at least one empty field has become available.

9. The method of claim 8 wherein said restrictions prevent calls from being charged to said calling card numbers.

10. The method of claim 8 wherein said restrictions limit at least one of the following a) the number of calls charged to said calling card numbers b) the amount of communications expenses that can be debited to said calling card numbers c) the destination numbers for calls charged to said calling card numbers.

11. A method of operating a computer system for use in the billing operations of a calling card call, said computer system comprising:

a database which stores at least one calling card number that is assigned to a subscriber for whom at least one billing parameter needed to create a billing record when said calling card number is used, is unavailable to create a complete account record for said subscriber in said database;

means responsive to receiving in said database a request for a calling card call to be charged to the calling card number, for validating said calling card number;

means for storing in said database billing data associated with said calling card call and said calling card number upon completion of said calling card call; and means responsive to receiving signals indicative of availability of said at least one billing parameter, for generating a billing record for said calling card call by entering said at least one billing parameter in said at least one specific field in said billing record with said at least one billing parameter, and by processing said stored billing data to be included in said billing record.

12. The system of claim 11 further comprising:

means for periodically checking the availability of said at least one billing parameter for said said account records and means for combining said billing data and said at least one billing parameter to generate said billing records when said said at least one billing parameter becomes available.

13. The system of claim 12 wherein the means of storing billing data associated with said call further includes means for formatting said billing data to form a pseudo billing record for said call, said pseudo billing record having an identical format to a billing record to facilitate subsequent inclusion of of said at least billing parameter in said pseudo billing record to form a complete billing record.

14. The system of claim 11 wherein said billing records include information associated with said call, said calling card number and said subscriber.

15. A system for billing a telephone call which is charged to a calling card number preceding the availability of subscriber-related information for that card number, said system comprising:

means for generating a billing record from data received after the termination of said telephone call;

means for periodically checking the availability of said subscriber-related information; and means for including in said billing record at least part of said subscriber-related information when said subscriber-related information becomes available.

16. The system of claim 14 wherein said billing record includes a billing number associated with said subscriber and said calling card number.

17. A system of billing telephone calls charged to calling card numbers comprising:

means for receiving billing data associated with said calls;

means for submitting said billing data to a processor to generate a billing record for each one of said calls when subscriber-related information needed to create said billing record is available for said calling card number; and in response to a code indicating the inability of said processor to generate a billing record for a particular call charged to one of said calling card numbers due to unavailability of said subscriber-related information for said calling card number, means for resubmitting periodically said billing data to said processor until said subscriber-related information is available for said calling card number and said billing record is generated.

18. A database system for use in the administration of calling card numbers, comprising means for creating in said database account records for subscribers associated with said calling card numbers, each one of said account records having at least one empty field reserved for unavailable subscriber's identification information;

means for incrementing a counter associated with each respective calling card number for each calling card call billed to said respective calling card number, means for preventing further calls from being billed to a calling card number once the counter associated with that calling card number reaches a predetermined threshold; and means responsive to reception of subscriber identification information for a calling card number for removing said counter and said predetermined threshold for said calling card number to permit unrestricted use of said calling card number.

19. The system of claim 18 further comprising means for placing restrictions to prevent calls from being charged to said calling card numbers.

20. The system of claim 18 further comprising means for placing restrictions to limit at least one of the following a) the number of calls charged to said calling card numbers b) the amount of communications expenses that can be charged to said calling card numbers c) the destination numbers for calls charged to said calling card numbers.

* * * * *